United States Patent
Knight

(10) Patent No.: US 8,064,876 B2
(45) Date of Patent: Nov. 22, 2011

(54) SYSTEMS FOR USE WITH MULTI-NUMBER CELLULAR DEVICES

(75) Inventor: Marachel L. Knight, Plano, TX (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 477 days.

(21) Appl. No.: 12/242,795

(22) Filed: Sep. 30, 2008

(65) Prior Publication Data

US 2010/0081460 A1    Apr. 1, 2010

(51) Int. Cl.
*H04W 4/24* (2009.01)
(52) U.S. Cl. .................. 455/406; 455/432.3; 455/433
(58) Field of Classification Search .......... 455/405–409, 455/432.1–433
See application file for complete search history.

(56) References Cited

U.S. PATENT DOCUMENTS

| | | | | |
|---|---|---|---|---|
| 5,329,578 A | * | 7/1994 | Brennan et al. | 379/211.03 |
| 2003/0119479 A1 | * | 6/2003 | Arima et al. | 455/408 |
| 2005/0170854 A1 | * | 8/2005 | Benco et al. | 455/461 |
| 2007/0105531 A1 | * | 5/2007 | Schroeder | 455/411 |

* cited by examiner

*Primary Examiner* — Ajit Patel
*Assistant Examiner* — Erica Navar
(74) *Attorney, Agent, or Firm* — Moazzam & Associates, LLC

(57) ABSTRACT

Devices and methods are disclosed which relate to a multi-number cellular communication system that allows a single mobile device to use more than one telephone number. This cellular communication system assigns more than one telephone number to a mobile device. When a call is made to that mobile device from any of the assigned telephone numbers, a connection is made to the mobile device. When a user of the mobile device places an outgoing call, the user selects which telephone number to use for that outgoing call.

20 Claims, 4 Drawing Sheets

SYSTEMS FOR USE WITH MULTI-NUMBER CELLULAR DEVICES

BACKGROUND OF THE INVENTION

1. Field of the Invention

The present invention relates to mobile communication systems. More specifically, the present invention relates to mobile communication systems able to identify and be utilized by multi-number cellular devices.

2. Background of the Invention

Cellular or mobile telephones are tremendously popular. It is estimated that at the end of 2007 the total worldwide subscriber rate reached 3.3 billion. Close to 80% of the world's population enjoys mobile telephone coverage, a figure that will only continue to increase. As cellular telephones gain popularity, their functionality increase as well. Standard service includes voice calling, caller ID, call waiting, and voice mail, among others. Service providers also offer text messaging, push mail, navigation, and even a high-speed internet connection directly to your telephone.

At the same time, people have become much more dependent on their cellular telephones. Many people no longer have traditional land-line telephones in their house, instead choosing to rely on their cellular telephone. Cellular telephones can accomplish almost everything that a land-line telephone does with the added benefit of being able to take with the user on the go. And that is the least a cellular telephone has to offer.

In the business world cellular telephones have become a necessity. With the fast pace of business today people must be reachable at any time of day, every day. With cellular telephones, laptop computers, and Personal Digital Assistants (PDAs), users can easily be called or e-mailed anytime and almost anywhere. Companies have come to rely on the luxury of instant communication with their employees. Decisions can be made faster and more confidently. For the small business entrepreneur, hiring employees is not always a priority, especially in the beginning. These entrepreneurs must handle everything themselves at times, and need to stay connected to their clients. Having telephone calls, email, internet, and navigation all on one mobile device is invaluable.

Companies will give their employees cellular telephones, laptop computers, and PDAs for business use. Since many of their employees already have a personal cellular telephone, many employees encounter a dilemma. Concerned with the hassle of changing their personal number, many forego the possibility of making the business telephone their personal telephone also. Also, businesses can frown upon personal calls being made from company devices. Thus, because of the necessity of a cellular telephone for both business and pleasure, many people are forced to have multiple accounts, meaning they must carry around more than one mobile device or telephone.

Small business entrepreneurs find it hard to separate their personal and business lives. Maintaining contact with clients must be a priority, but this can lead to a mixture of business and leisure. Emailing a client back while in the middle of the supermarket can become a common occurrence. The desire to have a personal telephone and a business telephone comes into view quickly, but the present solutions are far from ideal.

There are a few ways to cope with the problem of having to carry multiple cellular telephones. As technology improves mobile devices get smaller and lighter. However, the burden is not limited to sheer size and weight. There's the burden of making sure two batteries are charged, which means making sure to pack two AC adapters when traveling. Different telephones will most likely require different types of memory cards. Any games, ring tones, or music downloaded will be limited to that telephone.

In order for the service provider to differentiate between cellular telephones, it must read the hardware ID from the telephone. Each cellular telephone has a unique hardware ID stored within the telephone itself. Some cellular telephones have a hardware ID along with the user's name and account information. This information is stored on an identifier, also within the cellular telephone. The identifier, in some cases, contains its own memory and processor, and is removable.

Global System for Mobile communications (GSM) and other devices utilize identifiers called SIM cards. SIM cards securely store the service-subscriber key (IMSI) used to identify a subscriber. The SIM card currently allows users to change telephones by simply removing the SIM card from one mobile telephone and inserting it into another mobile telephone or broadband telephony device. However, each SIM card only utilizes one account and telephone number.

Some cellular telephones do not have a SIM card, such as devices using a Code Division Multiple Access (CDMA) protocol. These cellular telephones have a hardware ID that is read by the service provider and assigned an account on the server side, but the hardware ID is not removable. Furthermore many of these telephones do not accept SIM cards. For people having multiple telephones, at least one of which does not utilize a SIM card, the need for a personal and business telephone requires them to carry two separate fully functional cellular telephones.

There are few advantages to land-line telephones in this day, but businesses have been using one telephone for a plurality of different lines for years now. However, no such system exists for cellular or mobile phones or devices. What is needed is a mobile telephone system capable of handling multiple numbers contained on one mobile device.

SUMMARY OF THE INVENTION

The present invention relieves the strain of carrying two mobile devices by introducing multi-number cellular communication systems that allow a single mobile device to use more than one telephone number. This cellular communication system assigns more than one telephone number to a mobile device. When a call is made to that mobile device from any of the assigned telephone numbers, a connection is made to the mobile device. When a user of the mobile device places an outgoing call, the user selects which telephone number to use for that outgoing call. This decision is made either previously as a default option, by dialing a prefix before the destination telephone number, in response to an audible prompt by the service provider, as a menu option on the mobile device's software, etc.

Furthermore, the multi-number cellular communication system is used with multi-number mobile devices as well as traditional mobile devices. The system utilizes a plurality of databases to store billing information, service information, and user defined call preferences. When a call is placed to the mobile device, the cellular communication system determines if a line on the destination mobile device is in use and directs the call based upon the user's preferences. Each telephone number is associated with an account, of which each have separate capabilities depending on the service plan selected. When a connection is requested, the system determines the mobile device's service capabilities, notifying a user if a telephone number is requesting an unauthorized connection. Usage data is kept separate for each account of the mobile device for billing purposes.

In one exemplary embodiment, the present invention is a multi-number cellular communication system, including a plurality of wireless transmitters, a gateway in communication with the plurality of wireless transmitters, a multi-number controller in communication with the gateway, and a billing database in communication with the gateway. The multi-number controller allows a mobile device with a multi-number service plan to use more than one telephone number, while the billing database maintains a separate record for each telephone number.

In another exemplary embodiment, the present invention is a multi-number cellular communication system, including a plurality of cellular towers, a gateway in communication with the plurality of cellular towers, a multi-number logic unit in communication with the gateway, and a billing database in communication with the gateway. The multi-number logic unit identifies a mobile device with a multi-number service plan and allows it to use more than one telephone number while the billing database maintains a separate record for each telephone number.

In yet another exemplary embodiment, the present invention is a method of connecting a mobile device through a cellular connection including providing a service plan that enables a mobile device to use more than one telephone number, connecting the mobile device through a network. A user may place and receive calls from a plurality of telephone numbers on the mobile device.

DETAILED DESCRIPTION OF THE INVENTION

Figure 1:
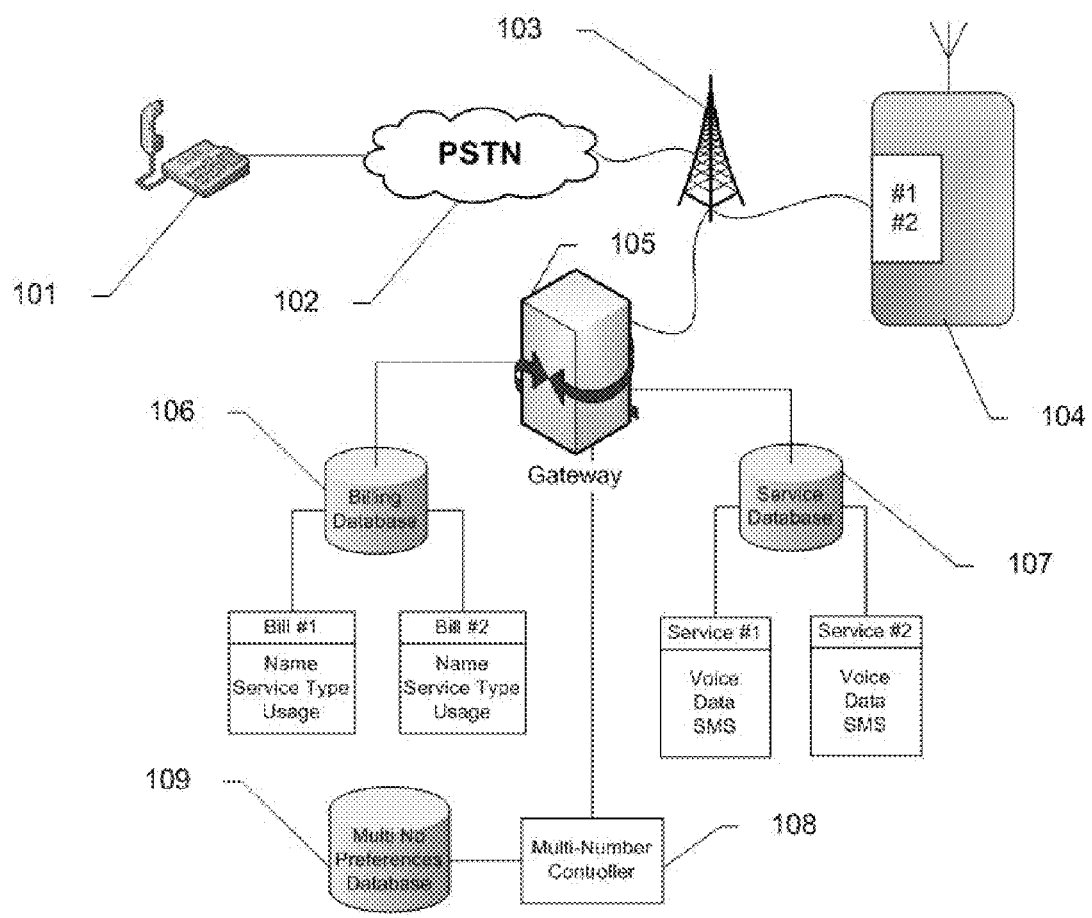
FIG. 1 shows a multi-number cellular communication system, according to an exemplary embodiment of the present invention.

The present invention includes multi-number mobile/cellular communication systems that allow a single mobile device to use more than one telephone number. This cellular communication system recognizes/accepts more than one telephone number to a mobile device. When a call is made to that mobile device from any of the assigned telephone numbers, a connection is made to the mobile device. When a user of the mobile device places an outgoing call, the user selects which telephone number to use for that outgoing call. This decision is made either previously as a default option, by dialing a prefix before the destination telephone number, in response to an audible prompt by the service provider, as a menu option on the mobile device's software, etc.

Furthermore, the multi-number cellular communication system is used with multi-number mobile devices as well as traditional mobile devices. The system utilizes a plurality of databases to store billing information, service information, and user defined call preferences. When a call is placed to the mobile device, the cellular communication system determines if a line on the destination mobile device is in use and directs the call based upon the user's preferences. Each telephone number is associated with an account, of which each have separate capabilities depending on the service plan selected. When a connection is requested, the system determines the mobile device's service capabilities, notifying a user if a telephone number is requesting an unauthorized connection. Usage data is kept separate for each account of the mobile device for billing purposes.

"Mobile device", as used herein and throughout this disclosure, refers to a portable device capable of wireless communication, and of the type that registers on the network of a service provider upon use. Examples of mobile devices include, but are not limited to, cellular telephones, wireless broadband aircards, personal data assistants, etc.

"Identifier", as used herein and throughout this disclosure, refers to a mechanism within a mobile device that contains a hardware ID of the mobile device. An example of an identifier is a SIM card. Identifiers can store more information than simply a hardware ID, and may have their own processors and memory.

"Hardware ID", as used herein and throughout this disclosure, refers to the unique code within a mobile device that identifies it from every other mobile device on a network. Examples of a hardware ID include a service-subscriber key, an Electronic Serial Number (ESN), a Media Access Control (MAC) address, a serial number, etc. The hardware ID is usually an alphanumeric code. A device can have a single ESN, MAC, serial number, etc., and be considered a single hardware ID. When reference is made to multiple or a plurality of hardware IDs, this refers to more than one ESN, more than one MAC address, more than one serial number, etc.

"Network Registration", as used herein and throughout this disclosure, refers to the process initiated by a mobile device powering on or entering the range of a cellular tower. This process includes identification and authentication such that the mobile device is allowed communication with the network.

Exemplary embodiments of the present invention add a multi-number controller to an otherwise substantially complete service provider cellular network. When a user places a telephone call from a mobile device, it is first routed to a services database where the service provider primarily determines whether or not the account is active, has voice capability, etc. In addition to these capabilities, exemplary embodiments of the present invention introduce a multi-number capability. This is the capability of a mobile device to make and receive calls from more than one phone number. If this capability is found, the call is then routed to the multi-number controller. Before forwarding the call to its ultimate destination, the multi-number controller must prompt the user to input which telephone number to place the call from. In other words, which telephone number is going to show up on the caller ID, and which telephone number should receive the bill for this call.

Certain exemplary embodiments use an audible prompt requesting the user to select a number via the keypad with each key being associated with a different telephone number. Other exemplary embodiments allow for the user to dial a prefix before each call to specify which telephone number to use before dialing the destination telephone number. Many exemplary embodiments use a multi-number preferences database. This database stores default telephone numbers to make outgoing calls. The user can specify a default telephone number to use without a prompt unless a prefix is used or the default telephone number is changed. The multi-number controller is also responsible for setting up the preferences. An audible menu is used in exemplary embodiments that may resemble a voicemail setup menu.

When preferences are specified by a user concerning default telephone numbers and other multi-number information, these preferences are stored in a database. In exemplary embodiments this database is part of the multi-number controller, and communicates directly with it. Whenever a call is placed from a mobile device that contains the multi-number capability, the multi-number controller references the multi-number database for information concerning default telephone numbers.

Many of these exemplary embodiments are primarily for use with current cellular telephones, wireless aircards, personal data assistants and other mobile devices, but the system may also work with mobile devices specifically made for multi-number capability. For example, certain multi-number devices may be used, such as those described in co-pending application Ser. No. 12,242,773, filed Sep. 30, 2008, which is hereby incorporated by reference herein in its entirety. When a user utilizes a multi-number mobile device, the system does not necessarily need the audible prompts, prefixes, or preferences menu to work. These mobile devices have comparable options as part of the mobile device's operating system. Commands for telephone number selection and a preferences menu are built into the operating system of these multi-number mobile devices. A database of preferences is stored on the multi-number mobile device's memory. However, exemplary embodiments require another program within the multi-number controller to communicate with these multi-number mobile devices. A program is utilized which communicates with the multi-number mobile device as it sends information concerning which number to use for each call as well as updates on preferences.

FIG. 1 shows a multi-number cellular/mobile communication system, according to an exemplary embodiment of the present invention. In this embodiment, the system includes a landline 101 or other communications device outside a service provider network, a public switched telephone network (PSTN) 102, a cellular tower 103, a mobile device 104, a gateway 105, a billing database 106, a service database 107, a multi-number controller 108, and a multi-number preferences database 109. Landline 101 is in communication with PSTN 102. This allows landline 101 to make and receive calls to cellular networks. Cellular tower 103 is also in communication with PSTN 102, allowing users of mobile device 104, to connect with PSTN 102. Mobile device 104 includes multi-number devices, such as the device described in the co-pending application identified above. Mobile device 104 is also in communication with gateway 105 through cellular tower 103. Gateway 105 determines whether mobile device 104 has multiple numbers, what services mobile device 104 is capable of, the proper billing of mobile device 104, and preferences of mobile device 104. Gateway 105 utilizes billing database 106 to record the usage of mobile device 104. Billing database 106 maintains a separate record for each account associated with a telephone number used by mobile device 104. Gateway 105 utilizes service database 107 when handling a service request made by mobile device 104. When a service request is made, such as a request to make a voice call, send a text message, or initiate a data session, gateway 105 refers to service database 107 to ensure that the service plan associated with mobile device 104 contains that capability.

Multi-number controller 108 is utilized by the system when an outgoing connection is requested or when an incoming call is made or communication signal received while the user is already in a voice call. In order to determine which telephone number to use to place an outgoing connection and to determine what action to take while the user is already in a voice call, gateway 105 communicates with multi-number preference database 109. When a user first subscribes to a multi-number service, the user will need to setup the service with preferences. Until these preferences have been setup the user is prompted with an audible selection of which telephone number to use after dialing the telephone number of the destination. This audible prompt is one of the functions of multi-number controller 108. Multi-number controller 108 also handles the creation of preferences. This is a series of audible prompts that, with a top level menu that branches out into submenus, resembling a voice-mail setup. Within the preferences creation is the option of dialing a prefix to designate a telephone number to place the following call. Once gateway 105 determines, using service database 107, that the mobile device has the multi-number capability, it refers the call to multi-number controller 108 which can read the prefix and direct the call to the appropriate billing record.

Multi-number database 109 contains information like default telephone numbers to use for outgoing connections and whether or not to initiate call-waiting if an incoming voice call is requested while the user is already in a voice call. Other information included in this database are preference settings such as allowing an incoming personal call to go directly to voicemail if an active work call is in progress. Other options are also possible and within the scope of the present invention as would be recognized by one having ordinary skill in the art.

If mobile device 104 is a multi-number device, gateway 105 determines this as well as what other types of services mobile device 104 is capable of by communicating with service database 107. The first telephone number on mobile device 104 may have a voice plan only while the second telephone number on mobile device 104 has a data plan as well as a voice plan. So for example, when the user of mobile device 104 attempts to send an e-mail, he may not have a data plan for the telephone number selected to send that e-mail. Service database 107 communicates this to the user and, if applicable, alerts the user to select the mobile device's other telephone number, which is associated with an account that contains data capability. Gateway 105 uses multi-number controller 108 and multi-number preferences database 109 to determine the user's call preferences. For example, when mobile device 104 is in use with a first call and a second call is incoming to mobile device 104's other telephone number, preference database 109, and multi-number controller 108 communicate to gateway 105 what should be done with the incoming call. Possibilities include, but are not limited to, sending the second call straight to voicemail, sending the second call to call waiting, putting the second call on hold, notifying the caller that that the telephone number is busy, etc. During or after the use of mobile device 104, gateway 105 is in communication with billing database 106, recording the service type and usage by mobile device 104. Usage is usually measured in time for voice calls and kilobits for data sessions.

The multi-number cellular communication system can be used with either single-number or multi-number mobile devices. When requesting a connection on a multi-number mobile device, the system determines the capabilities of the telephone number being used, and returns an error if the attempted service is not allowed or available for a given number, even on a device having another number that allows such service. This could be because the user's service plan does not include the feature, the user has not selected the feature, the feature is not available in the area, the given number used does not include such feature, etc.

Figure 2:
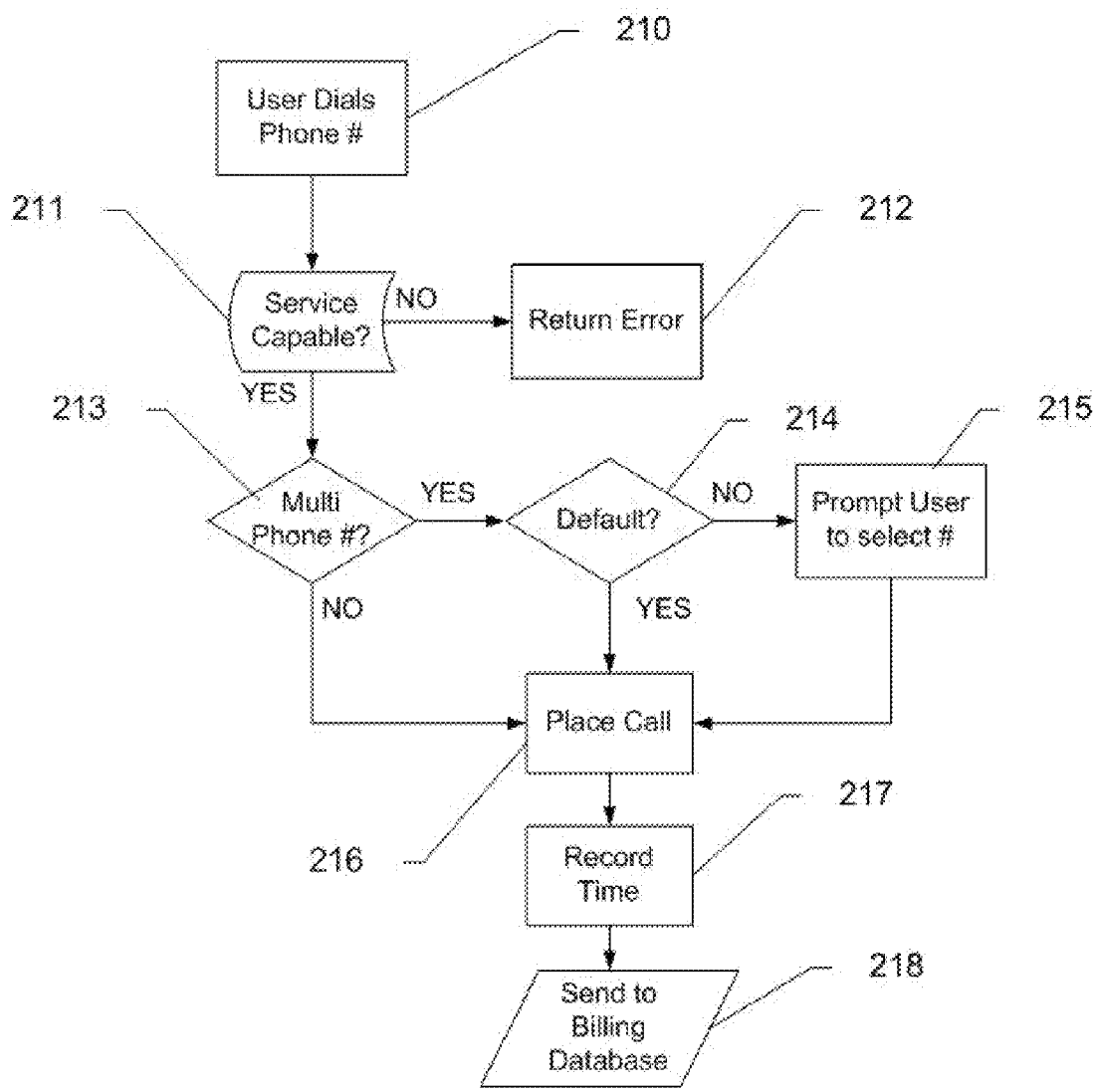
FIG. 2 shows a flowchart of a multi-number cellular communication system, according to an exemplary embodiment of the present invention.

FIG. 2 shows a flowchart of a multi-number cellular communication system, according to an exemplary embodiment of the present invention. In this embodiment, a user dials a telephone number 210. Alternatively, the user selects a service, such as sending a text message or accessing the internet. The system first determines whether the user's service plan is capable of this type of use 211. If the service plan does not contain that capability, such as if the user attempts to log-on to the internet but does not have a data plan, the system returns an error message to the user 212. If the service is capable, the system determines whether the mobile device is a multi-number mobile device 213. If the mobile device is not a multi-number mobile device, the connection is made 216. If the mobile device is a multi-number mobile device, the system determines whether the user has set a default outgoing telephone number to use for the type of use selected 214. If the user has selected a default telephone number, the connection is made using that telephone number 216. If the user has not selected a default telephone number, the system makes an audible prompt for the user to select a telephone number for the outgoing call 215. After the user has selected an appropriate telephone number, the connection is made 216. Once the connection is made, the system records the usage time 217. This data is sent to the billing database 218 for use in billing the user.

The multi-number cellular communication system also provides for incoming calls to multi-number mobile devices. The call may be incoming while the device is already in use. Therefore, in exemplary embodiments of the present invention the multi-number controller contains the logic necessary to direct incoming calls while the system determines if the mobile device is in use before connecting the call. The destination of the connection, whether directly to the multi-number mobile device as a call waiting, or straight to the user's voicemail, is determined by user-selected preferences.

Figure 3:
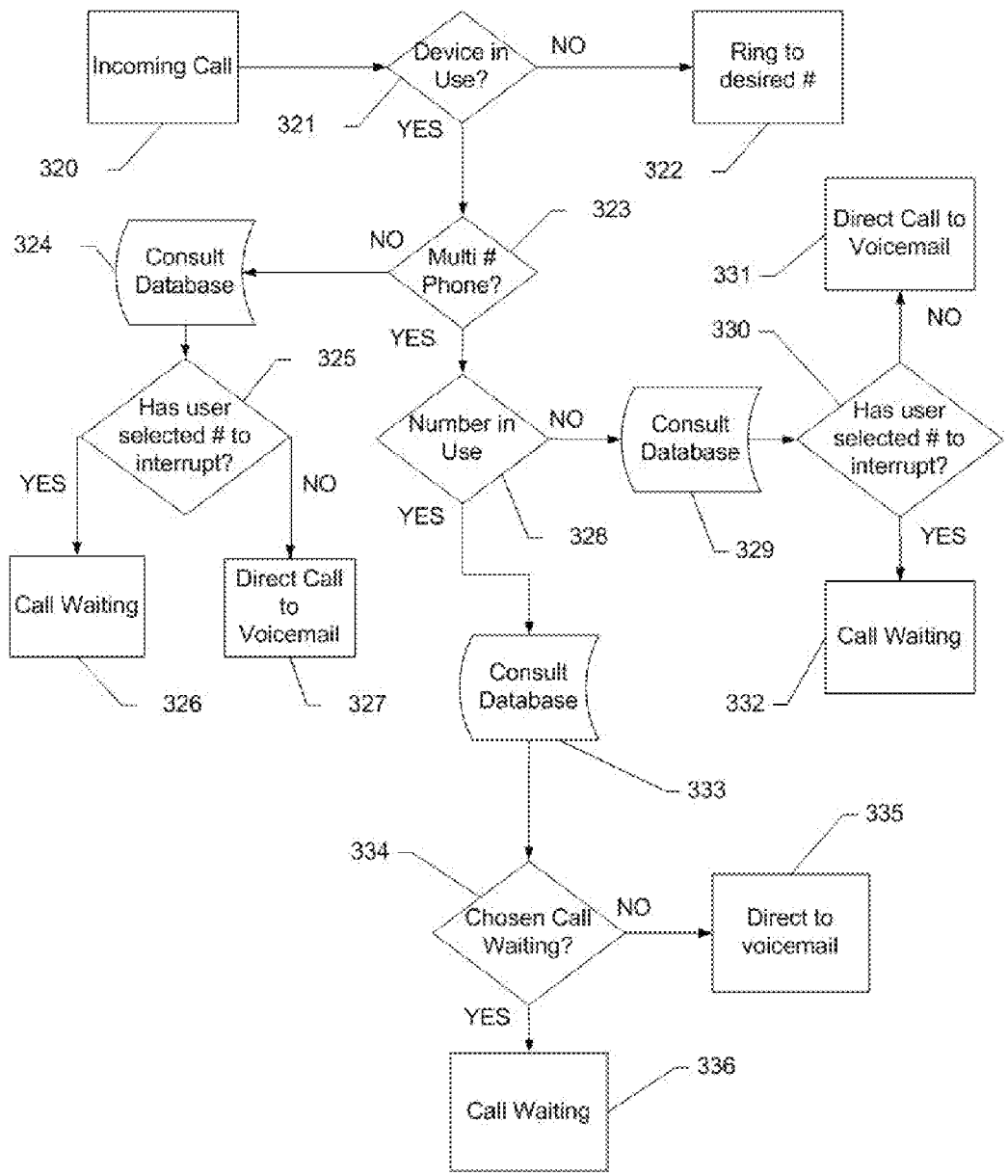
FIG. 3 shows a flowchart of a multi-number cellular communication system for use with mobile devices, according to an exemplary embodiment of the present invention.

FIG. 3 shows a flowchart of a multi-number cellular communication system for use with mobile devices, according to an exemplary embodiment of the present invention. In this embodiment, when a call is incoming 320 to a mobile device, the system determines whether the mobile device is in use 321. If the mobile device is not currently in use, the incoming call rings (or vibrates, etc.) to the dialed telephone number on the mobile device 322. If the mobile device is in use, the system determines whether or not the mobile device is a multi-number mobile device 323. This is accomplished by consulting the service database. If the mobile device is not a multi-number mobile device, the system consults a database of user programmed preferences 324. After consulting the preference database, the system determines whether the user has selected that the telephone number may be interrupted for incoming calls 325. If the user has selected to be interrupted, the call is directed to call waiting 326, where the user may answer it. If the user has selected not to be interrupted, the call is routed directly to the user's voicemail 327. If the device in question is a multi-number mobile device, the system determines whether the dialed number is currently in use 328. If the telephone number is not in use, the system consults a database of user preferences 329 to determine whether the user has selected to interrupt 330 the second telephone number that is currently in use. If the user has selected to interrupt the second telephone number, the call is directed to call waiting 332. If the user has selected not to be interrupted, the call is routed to the user's voicemail 331. If the dialed telephone number on the multi-number phone is in use, the system consults the user preference database 333. The system determines whether the user has selected call waiting, and to be interrupted on the line 334. If the user has selected to be interrupted, the incoming call is sent to call waiting 336. If the user has selected not to be interrupted, the incoming call is routed to the user's voicemail 335.

The preferences of the user may determine much of the routing of the calls. Therefore, in embodiments of the present invention, a menu is used by the multi-number cellular communication system to allow a user to program preferences. This menu, as well as the programmed preferences, is stored in a database. The menu can be accessed through a variety of interfaces. Among these are a user's mobile device, a computer, another telephone, etc. The scenario for a two number has been shown for sake of clarity. However, the present invention is applicable for any number of numbers for a given device as long as the same type of logic is followed.

Figure 4:
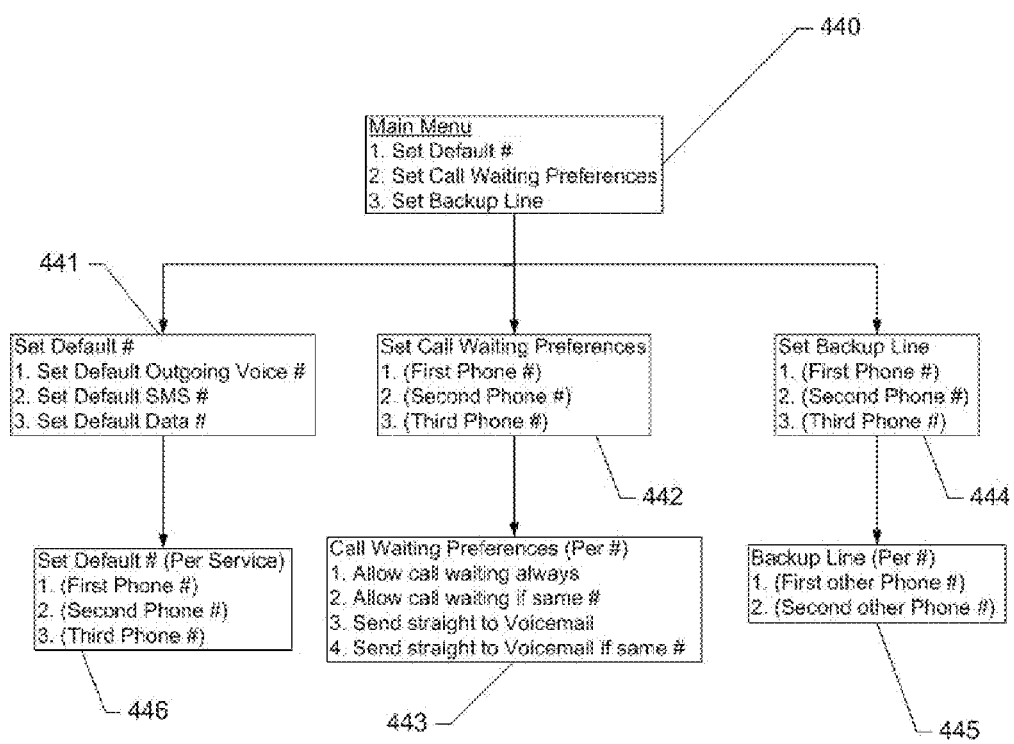
FIG. 4 shows hierarchy of a multi-number cellular communication system menu for mobile devices, according to an exemplary embodiment of the present invention.

FIG. 4 shows the hierarchy of a multi-number cellular communication system menu for mobile devices, according to an exemplary embodiment of the present invention. In this embodiment, a main menu 440 allows a user to choose from options including setting a default telephone number 441, setting call waiting preferences 442, and setting backup telephone numbers 444. When the user elects to set the default telephone number 441, the user is prompted to enter the default telephone number for each type of service 446. The user is given the option of setting a default outgoing voice telephone number, setting a default SMS telephone number, and setting a default data telephone number. With these default options set, a user may begin using a mobile device and the appropriate telephone number is used for each type of use. For instance, a user dials an outside telephone number from a mobile device with multi-number capability. If the user has not selected a specific telephone number to connect from, the default telephone number for outgoing telephone calls is used. When the user has elected to choose call waiting preferences 442, the user next chooses for which telephone number to choose preferences 443, as preferences can be set for each telephone number. Once the user has chosen a telephone number, the user may choose his or her preferences for this telephone number. The user can always allow call waiting for the telephone number, allow call waiting if the incoming call is for the same telephone number, send incoming calls straight to voicemail when the mobile device is in use, send incoming calls straight to voicemail when the same telephone number is in use, allow call waiting for incoming calls to a specific telephone number, etc. For instance, a user on his personal telephone number may wish all calls from his business telephone number to be received as a call waiting so that he may answer the call. The user selects this in the options for his personal telephone number. However, the user may not want personal calls to interrupt him while he is on the business telephone number. The user selects to have these sent directly to voicemail under the options for his business telephone number. When the user has selected to set a backup telephone number 444, he must choose from the available telephone numbers to backup. Once selected, the user is provided with a list of possible backup telephone numbers 445. In this embodiment, the system shifts the user to the selected backup telephone number in the event the primary telephone number is no longer functional. This may be, for instance, because the user has not paid the bill for that telephone number, the number of monthly minutes has been reached, the number of text messages allowed is reached, the monthly data usage has been reached, etc.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A multi-number cellular communication system, comprising:
    a plurality of wireless transmitters;
    a gateway in communication with the plurality of wireless transmitters;
    a service database in communication with the gateway, the service database containing service capabilities of each number of a mobile device with a multi-number service plan;
    a multi-number controller in communication with the gateway; and
    a billing database in communication with the gateway;
    wherein the multi-number controller allows the mobile device with the multi-number service plan to use more than one number, while the billing database maintains a separate record for each number, wherein the gateway references the service database to determine whether a selected number of the more than one number is subscribed to a selected service, and the gateway notifies the mobile device when the selected number is not subscribed to the selected service and alerts the mobile device to select a second number.

2. The system in claim 1, wherein each wireless transmitter is a cellular tower.

3. The system in claim 1, wherein the multi-number controller comprises logic for incoming calls, logic for outgoing calls, and a menu system for setting user preferences.

4. The system in claim 3, wherein the menu system is a hierarchy of audible menus, each responding to the touch of a key on a keypad.

5. The system in claim 4, wherein the multi-number controller further comprises a preferences database.

6. The system in claim 5, wherein the preferences database stores a plurality of preferences concerning default telephone numbers and call waiting.

7. The system in claim 6, wherein the multi-number controller references the preferences database during a connection of a call.

8. The system in claim 4, wherein the multi-number controller further comprises logic for communicating with a multi-number mobile device.

9. A multi-number cellular communication system, comprising:
    a plurality of cellular towers;
    a gateway in communication with the plurality of cellular towers;
    a service database in communication with the gateway, the service database containing service capabilities of each number of a mobile device with a multi-number service plan;
    a multi-number logic unit in communication with the gateway; and
    a billing database in communication with the gateway;
    wherein the multi-number logic unit identifies the mobile device with the multi-number service plan and allows it to use more than one telephone number while the billing database maintains a separate record for each telephone number, wherein the gateway references the service database to determine whether a selected number of the more than one number is subscribed to a selected service, and the gateway notifies the mobile device when the selected number is not subscribed to the selected service and alerts the mobile device to select a second number.

10. The system in claim 9, wherein each cellular tower transmits wireless signals to and from mobile devices.

11. The system in claim 9, wherein the multi-number logic unit comprises a logic for incoming calls, a logic for outgoing calls, and a menu system for setting user preferences.

12. The system in claim 11, wherein the menu system is a hierarchy of audible menus, each responding to the touch of a key on a keypad.

13. The system in claim 12, wherein the multi-number logic unit further comprises a preferences database.

14. The system in claim 13, wherein the preferences database stores a plurality of preferences concerning default telephone numbers and call waiting.

15. The system in claim 14, wherein the multi-number logic unit references the preferences database during a connection of a call.

16. The system in claim 12, wherein the multi-number logic unit further comprises a logic for communicating with a multi-number mobile device.

17. A method of connecting a mobile device through a cellular connection comprising:
    providing a service plan that enables a mobile device to use more than one telephone number;
    referencing a service database to determine whether a selected telephone number of the more than one telephone number is subscribed to a selected service; and
    connecting the mobile device through a network;
    wherein a user may place and receive calls from a plurality of telephone numbers on the mobile device, wherein a gateway notifies the mobile device when the selected telephone number is not subscribed to the selected service and alerts the mobile device to select a second telephone number.

18. The method in claim 17, wherein the connecting comprises one of an incoming and outgoing call.

19. The method in claim 17, further comprising referencing a preferences database.

20. The method in claim 17, further comprising communicating with a multi-number mobile device for preferences stored in the multi-number mobile device.

* * * * *